United States Patent Office 3,478,607
Patented Nov. 18, 1969

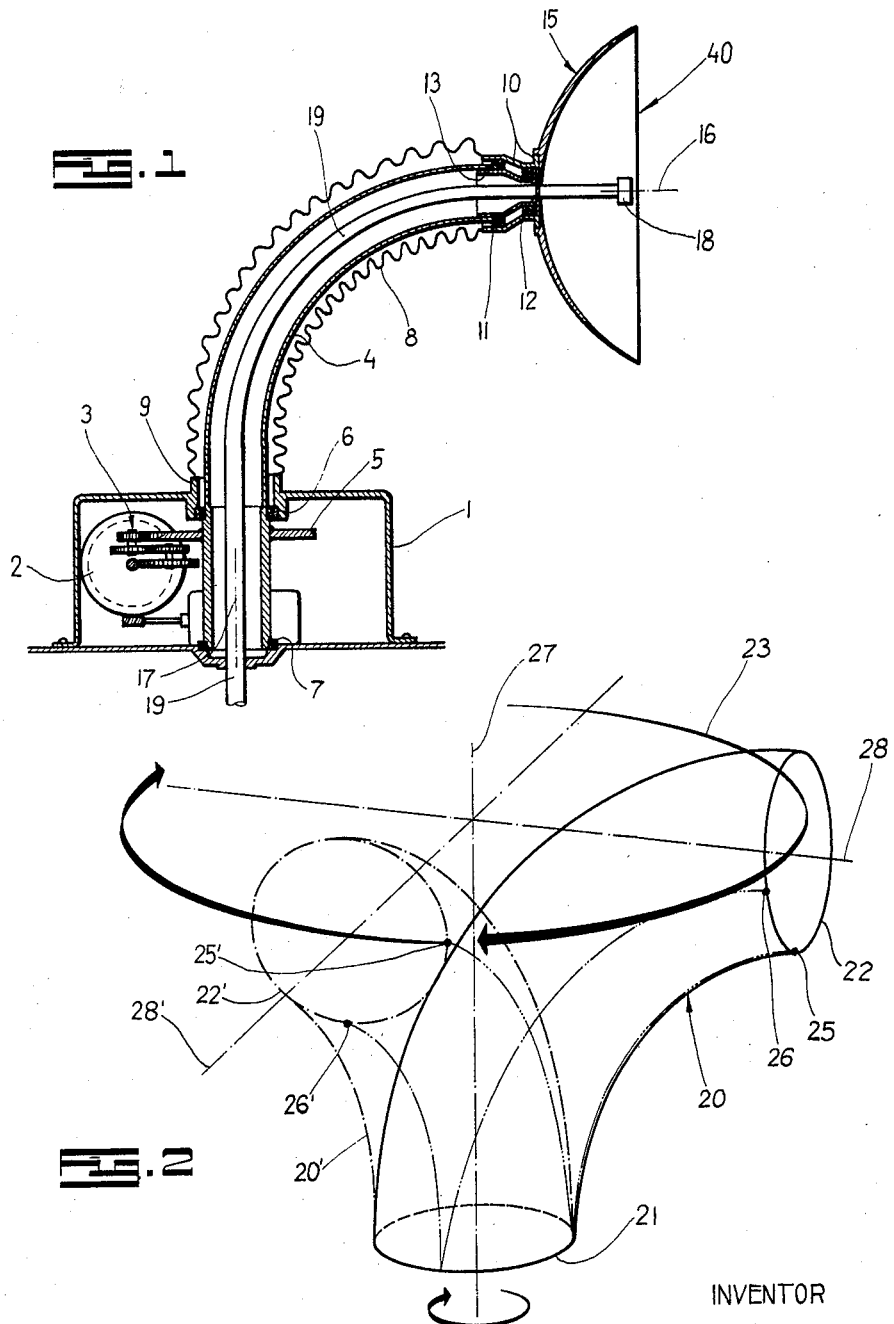

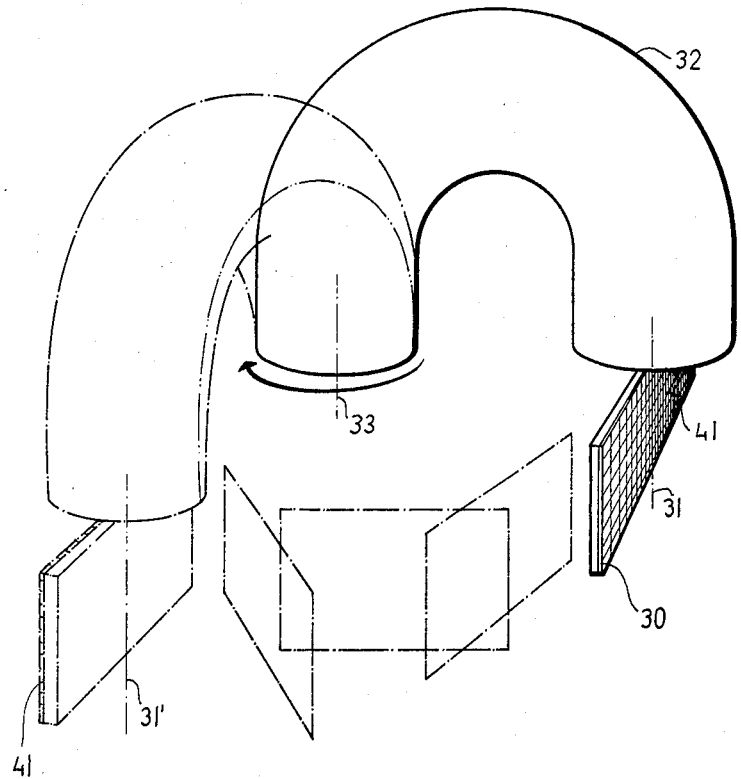

3,478,607
DEVICE FOR TRANSMITTING ROTARY MOTION
Erich Arbeitlang, Ottobrunn, near Munich, Germany, assignor to Bolkow Gesellschaft mit beschrankter Haftung, Ottobrunn, near Munich, Germany
Filed June 25, 1968, Ser. No. 739,736
Claims priority, application Germany, June 30, 1967, 1,625,018
Int. Cl. F16j 15/52
U.S. Cl. 74—18.1      12 Claims

ABSTRACT OF THE DISCLOSURE

A device for the transmission of rotary motion is comprised of a housing and a crankshaft rotatably mounted in and extending outwardly from the housing. Outwardly from the housing the crankshaft is curved so that its outer end describes a circle about its axis of rotation within the housing when the crankshaft is rotated. A flexible bellows is rigidly secured to the housing and encloses the shaft outwardly from the housing. A base plate is disposed across the end of the bellows at the outer end of the shaft and is arranged in rotatable relationship with the axis of the shaft at its outer end.

SUMMARY OF THE INVENTION

The present invention is directed to a device for the transmission of rotary motion and, more particularly, it is concerned with a crankshaft curved intermediate its ends and rotatably mounted at one end within a housing. A flexible bellows is rigidly attached to the housing and encloses the crankshaft outwardly from the housing. As the shaft rotates within the housing, its outer end travels in a circle about its axis of rotation and, in addition, the outer end of the bellows rotates about the axis of the shaft at its outer end.

Moreover, the device embodying the invention is concerned with a gas-tight seal for the interior of the device.

Sealed devices for the transmission of motion are presently being used, for example, in feed pumps for corrosive media and in vacuum and space travel technology.

In such previously known equipment, the gyrating or tumbling motion imparted to a base plate or similar type of element is generally achieved by means of a crank system derived from the rotary motion of a driven shaft.

In the German Auslegeschrift No. 1,233,668 a device is disclosed in which the plane translation motion of a base plate is transformed through an eccentric shaft into a rotary motion about an axis, that is the axis of rotation of the driven shaft.

In the publication "Special Designs with Metal Bellows" of Metallschlauchfabrik Pforzheim, vorm. Hch. Witzenmann G.m.b.H., the bottom portion of the bellows performs a tumbling motion while the shaft, driven by the bottom portion through a bearing, follows only one of the two rotary motions of the bottom portion and the second rotary motion is in effect "filtered out."

In both of these arrangements bearings are required outside of the housing or of the bellows attached to the housing. Such bearings have considerable disadvantages, especially in outer space applications or when used in an atmosphere containing a corrosive gas, because they tend either to freeze or to wear very rapidly. Another basic disadvantage in these various known drive systems is that they are limited to the mechanical transmission of a rotary movement, however, in many instances electrical, pneumatic or other types of power output must be transmitted between a housing and an instrument spaced outwardly from the housing. Due to the need for the transmission of such outputs, additional connections are required with sliding contacts or seals which, in turn, have similar disadvantages to those mentioned above for bearings.

Accordingly, it is the primary object of the present invention to avoid the disadvantages experienced in the devices previously used, and to afford means for the transmission of energy, whether it is mechanical, electrical, pneumatic or some other type, within a sealed arrangement between a housing and an instrument or similar member spaced from the housing.

Another object of the invention is to provide an arrangement wherein no bearings, sliding contacts, or seals are required exteriorly of the housing or of a bellows attached to it.

Still another object of the invention is to utilize a crankshaft rotatably mounted within the housing and curved along its axis outwardly from the housing so that during rotation its outer end travels in a circle about the axis of rotation within the housing.

Moreover, another object of the invention is to seal the crankshaft within a flexible bellows for its length outwardly from the housing and to supply a rigid connection between the bellows and the housing.

Another object of the invention is to mount an instrument on the outer end of the crankshaft rigidly secured through a base plate to the flexible bellows so that in addition to traveling in a circle about the axis of rotation of the crankshaft within the housing the instrument at the end of the shaft has a gyratory motion about the axis of the shaft at its outer end.

Therefore, by means of the present invention the problems experienced in the past are overcome by employing a hollow crankshaft rotatably mounted within a housing and with its axis located outwardly from the point at which it is rotatably mounted being curved so that its outer end is not in rectilinear alignment with the axis of rotation of the crankshaft within the housing. Extending from the housing outwardly to the outer end of the shaft, a flexible bellows completely encloses the shaft and a base plate is attached to and closes the outer end of the bellows and is arranged in rotatable relationship with the outer end of the shaft. Additionally, a flexible line extends through the hollow crankshaft from the housing through the base plate and into an instrument or other member and is rigidly attached to the outer surface of the base plate. Means are provided within the housing for rotating the crankshaft so that its outer end curved out of alignment with its end within the housing travels in a circle about the axis of rotation. The base plate secured to the flexible bellows is also engaged through bearing means to the outer end of the crankshaft and travels with it in a circular path about the axis of rotation of the crank. At its housing end, the bellows is firmly secured to the housing and as a result it does not rotate about the axis of the crank within the housing. However, the outer end of the bellows is positioned about the outer end of the crank and travels with it in the circular path about the axis of rotation. As a result, the bellows is bent or twisted constantly in accordance with the respective angular position of the crank and the base plate, which is rigidly secured to the bellows, is arranged in rotatable relationship about the axis of the crankshaft at its outer end. Extending through the hollow crankshaft is a flexible line or cable which carries out the same motion as the bellows relative to the crank. At the points at which the flexible line passes through the housing and through the base plate, there is no relative motion between it and the components through which it passes. The difference in relative rotary motion between the crankshaft and the flexible line and bellows is the effect that the invention utilizes in achieving the desired motion of the device. Since the instrument is rigidly mounted on the base plate, all relative motion between the flexible line and the instrument are obviated and sliding contacts or seals are unnecessary. The crank is secured to the base plate by bearings which are located inside the bellows and as a result are not exposed to the vacuum or atmosphere of corrosive medium located about the bellows. This enclosed disposition of the bearings avoids any freezing or rapid wear that might develop if the bearing were exposed to the atmosphere about the bellows.

The motion of the base plate and the crankshaft relative to the housing, serving as a reference body, can be considered as the sum of two separate rotary motions, that is, a primary motion about the axis of rotation of the crank, and a secondary rotary motion about the axis of the crank at its other end to which the base plate is attached. The attitude of these two axes relative to each other and accordingly the type of motion of the instrument is determined by the dimensions and the angle of curvature of the crank.

The device embodied in the present invention has a preferred application in driving instruments, in particular antennas, solar reflectors or similar electrical instruments such as are disposed outside of a space satellite and which are arranged to receive or to emit radiation and are adapted for orientation toward a celestial point. In such an arrangement, the invention utilizes a housing containing a drive mechanism with a hollow crankshaft rotatably mounted at one end within the housing and operatively connected to the drive mechanism. The hollow crankshaft is formed of a rigid construction and, at a point spaced outwardly from the housing, it is bent out of its axis of rotation by an angle of approximately 90°. Disposed about the crankshaft and extending for its full extent from the housing to its other end is a rotation resistant metal bellows which is secured at its outer end to a base plate. In addition, the outer end of the crank is rotatably fixed to the base plate. Disposed within the hollow crank is an electrical cable which is rigidly secured to the housing and to the base plate as it extends through it so that no relative movement occurs between these parts.

In another of the embodiments set forth herein, the hollow crank is disposed in a curved configuration extending through 180° and the metal bellows, as before, is curved in the same configuration extending from the housing to the base plate at the outer end of the crank.

A feature of the invention is the disposition of the instruments mounted on the base plate so that their effective surfaces are disposed perpendicularly to the axis of the crank at its outer end. This arrangement is particularly advantageous for reflectors or antennas which are symmetrically arranged about the axis at the outer end of the crank and, accordingly, their rotation or gyratory movement about the outer end of the crank is insignificant.

Still another important characteristic of the invention is that the instruments disposed on the base plate may have their surfaces receiving or emitting radiation disposed in parallel relationship with the axis of the crank at its outer end. Such an arrangement makes it possible to orient the effective areas of the instrument within the entire spatial annular range defined by the rotation about the axes within the housing and at the other end of the shank.

The various features of novelty which characterize the invention are pointed out with particularity in the claims annexed to and forming a part of this specification. For a better understanding of the invention, its operating advantages and specific objects attained by its use, reference should be had to the accompanying drawings and description matter in which there are illustrated and described preferred embodiments of the invention.

BRIEF DESCRIPTION OF THE DRAWINGS

In the drawings:

FIG. 1 is a longitudinal sectional view through a device embodying the present invention and utilizing a crankshaft whose axis is curved through an angle of approximately 90°;

FIG. 2 is a schematic representation of the motion of the various parts of the device shown in FIG. 1; and FIG. 3 is a schematic representation of a device disclosing an alternate embodiment of the invention wherein the crankshaft is curved through an angle of approximately 180°, and the instrument located at the outer end of the crankshaft is indicated in a plurality of positions relative to the movement of the crankshaft.

DETAILED DESCRIPTION OF THE PREFERRED EMBODIMENTS

In FIG. 1, a device is illustrated for imparting rotary motion to a gyrating sun mirror.

The device is comprised of a housing 1 containing a drive motor 2 and a speed reducer 3 which transmit the rotation of the motor shaft to a gear 5 mounted near the end of a hollow crankshaft 4. Within the housing 1 the crank 4 is mounted by means of a pair of spaced bearings 6 and 7. Outwardly from the locations at which it is rotatably mounted within the housing the crankshaft 4 which is formed of a rigid material is bent through an angle of approximately 90° from the axis of rotation within the housing. For its length exteriorly of the housing 1, the crankshaft 4 is enclosed within a flexible metal bellows 8 which assumes substantially the same curvature as that of the crank. The flexible bellows is rigidly attached to the housing in gas-tight engagement, such an attachment may be accomplished by soldering or welding the bellows to the flange 9 which extends outwardly from the housing 1. At its outer end remote from the housing the bellows 8 is closed by a base plate 10. The outer end of the crankshaft 4 is rotatably fixed to the base plate 10, by means of the spaced bearings 11 and 12.

Secured to the face of the base plate 10, opposite the one secured to the bellows, is a concave reflector 15 symmetrically arranged about the base plate and the axis of the crankshaft at its outer end. Because of the symmetrical arrangement of the reflector, the rotational motion it has about the axis 16 of the crank at its outer end is of no significance and only the rotation of the reflector about the axis of rotation 17 within the housing is effective. The effective surface 40 of the reflector is disposed perpendicularly to the axis of the crankshaft at its outer end. Disposed along the axis of symmetry of the reflector 15 is a thermo-electric energy converter 18, such as the thermionic converter type, and the current generated by this converter is conducted through a line 19 which extends through the interior of the hollow crankshaft to a point of use within the satellite body (not shown).

When the hollow crank rotates within the housing, both the bellows 8 and the flexible line or cable 19, since they are rigidly secured to both the housing and the base plate 10, are always bent or twisted in accordance with the position of the crank as it rotates about its axis within the housing. Due to this arrangement, as the crankshaft 4 rotates about its axis of rotation 17, the base plate 10 and the instrument or reflector 15 secured to it travel in a circle about the axis of rotation. In addition, due to the twisting effect provided by the bellows 8 and the line 19, the base plate and the instrument 15 have a gyrating motion about the axis 16 of the crankshaft at its outer end. As a result of this arrangement it is not necessary to provide a sliding contact to remove the electrical energy generated within the converter 18 of the reflector 15.

For a graphic illustration of the path of movement of the reflector 15, reference is made to FIG. 2 which affords a schematic showing of the rotational paths of movement of the device. In FIG. 2, the tube marked 20 corresponds to the bellows 8 in FIG. 1. The base 21 of the tube 20 is stationary, corresponding to the end of the bellows rigidly secured to the flange 9 of the housing 1. The outer end 22 of the tube 20, representing the base plate 10, moves in a circle 23 about the primary axis 27, that is the axis of rotation of the crank within the housing 1. Further, the outer end 22 of the tube 20 has a gyrating motion about the axes 28, 28', that is the axis at the outer or base plate end of the crankshaft and bellows. In this arrangement, due to the right angle curvature of the crankshaft, the axes 28, 28' are disposed perpendicularly to the primary axis 27. The effect of the twisting or turning action imparted to the bellows and cable as the crank is rotated within the housing causes the base plate and in turn the reflector 15 to travel in a circular path about the axes 28, 28'. The peripheral point 25 on the outer end 22 is shown at the bottom of the tube 20 where the tube is shown in full lines, that is, on the right-hand side of FIG. 2. As the crank turns the device in the direction shown by the arrows, the point 25 travels to the location of point 25' in the showing of the outer end 22' of the tube 20' in dot-dash lines approximately at the center of FIG. 2. In this location, the outer end 22' of the tube is rotating about the axis 28' and similarly the point 26 on the outer end 22 moves into the position 26' on the outer end 22'. This drawing describes the manner in which the device moves or rotates about the axis 27 and the axes 28, 28' as the outer end 22 of the device travels around the circle 23.

In FIG. 2 a device generally similar to that disclosed in FIG. 1 is illustrated in which the hollow crankshaft and the bellows 32 are curved through an angle of approximately 180° and an electrical instrument 30 is mounted at the outer or base plate end of the crankshaft and is formed as a solar cell whose surfaces are disposed in parallel relationship with the axis of the crank at its end remote from the housing. By virtue of the size and the angle of curvature of the crank the vectors of the primary and secondary rotations, that is the rotation about the axis 33 within the housing and about the axes 31, 31' at the opposite end of the crankshaft, are provided so that they are additive. For example, when the bellows 32 pivots through an angle of 90°, the solar cell surface 30 performs a rotary motion of 180°. In this way, as the bellows or the device passes through an angle of 180° about the primary axis of rotation 33, the bellows rotates sufficiently to turn the solar cell surfaces by 360°.

While in the embodiments set forth in the drawing the angle of curvature of the crank has been shown to be 90° or 180°, it is also possible to curve the crank at any desired angle, whereby the total rotary motion of the instrument mounted on the base plate at the end of the bellows and of the hollow crank is determinable from the vector addition of the primary and secondary rotational movements of the device.

What is claimed is:
1. A device for transmitting gyratory motion comprising a housing, a hollow crankshaft having one end rotatably mounted within said housing and the other end thereof spaced outwardly from said housing, a flexible bellows member spaced outwardly from and enclosing said hollow crankshaft, said bellows member disposed in rigid engagement with said housing, a base plate rigidly secured to the end of said bellows member remote from said housing, the other end of said crankshaft secured to said base plate whereby said shaft and base plate are rotatable relative to one another, the axis of said shaft having a curvilinear configuration at a location outwardly of the position at which said crankshaft is rotationally mounted within said housing and said bellows having substantially the same curvilinear configuration whereby the axis of said crankshaft at its other end is not in continuous rectilinear alignment with the axis of rotation of the crankshaft at its end within said housing, and said base plate at the other end of said crankshaft rotates in a circle about the axis of rotation within said housing and has a gyratory motion relative to the axis of said crankshaft at its end affixed to said base plate.

2. A device as set forth in claim 1, wherein means are disposed within said housing operatively connected to said crankshaft for rotating said crankshaft.

3. A device as set forth in claim 1, wherein said crankshaft is formed of a rigid material whereby it retains its angle of curvature during its rotation within said housing.

4. A device as set forth in claim 1 wherein said bellows member is disposed in sealed engagement with said housing and said base plate.

5. A device as set forth in claim 1, wherein a flexible cable is disposed within and extending through said hollow crankshaft between said housing and said base plate, and said cable rigidly secured to said housing and base plate.

6. A device as set forth in claim 5, wherein a member is rigidly secured to said base plate and extends therefrom on the opposite side thereof from said bellows, said member arranged to be rotated with said base plate in a circle about the axis of rotation of said shaft within said housing and to rotate relative to the axis of said shaft at its end secured to said base plate.

7. A device as set forth in claim 6, wherein said member is disposed symmetrically about the axis of said shaft at its end attached to said base plate.

8. A device as set forth in claim 1, wherein a pair of spaced bearings are positioned on said shaft and are secured to said housing for effecting rotation therebetween.

9. A device as set forth in claim 1, wherein a pair of spaced bearings are mounted on said crankshaft at its other end and are secured to said base plate for affording relative rotational movement between said shaft and said base plate and bellows member.

10. A device as set forth in claim 6, wherein said base plate is disposed perpendicularly to the axis of said shaft at its other end.

11. A device as set forth in claim 5, wherein said flexible line is an electrical cable extending through said member, said base plate, said hollow crankshaft and said housing.

12. A device as set forth in claim 6, wherein said member has a pair of operative surfaces arranged in planes extending in parallel relationship with the axis of said crankshaft at its other end.

References Cited

UNITED STATES PATENTS

| | | | |
|---|---|---|---|
| 2,607,233 | 8/1952 | Bosch | 74—18.1 |
| 3,077,117 | 2/1963 | Munro | 74—18.1 |
| 3,407,476 | 10/1968 | Hamren | 74—17.8 |

FOREIGN PATENTS 556,172   4/1957   Belgium.

FRED C. MATTERN, Jr., Primary Examiner
F. D. SHOEMAKER, Assistant Examiner